United States Patent
Sun et al.

(10) Patent No.: US 8,159,636 B2
(45) Date of Patent: Apr. 17, 2012

(54) REFLECTIVE DISPLAYS AND PROCESSES FOR THEIR MANUFACTURE

(75) Inventors: Chenhang Sun, Santa Clara, CA (US); Haiyan Gu, Fremont, CA (US); Xiaojia Wang, Fremont, CA (US); Yajuan Chen, Fremont, CA (US); Jack Hou, Fremont, CA (US)

(73) Assignee: Sipix Imaging, Inc., Fremont, CA (US)

( * ) Notice: Subject to any disclaimer, the term of this patent is extended or adjusted under 35 U.S.C. 154(b) by 1539 days.

(21) Appl. No.: 11/386,047

(22) Filed: Mar. 20, 2006

(65) Prior Publication Data

US 2006/0228532 A1 Oct. 12, 2006

Related U.S. Application Data

(60) Provisional application No. 60/669,910, filed on Apr. 8, 2005.

(51) Int. Cl.
*G02F 1/1335* (2006.01)
*G02B 26/00* (2006.01)

(52) U.S. Cl. .................. 349/106; 349/113; 359/296

(58) Field of Classification Search .................. None
See application file for complete search history.

(56) References Cited

U.S. PATENT DOCUMENTS

| | | |
|---|---|---|
| 3,668,106 A | 6/1972 | Ota |
| 4,071,430 A | 1/1978 | Liebert |
| 4,093,534 A | 6/1978 | Carter et al. |
| 4,285,801 A | 8/1981 | Chiang |
| 4,680,103 A | 7/1987 | Beilin Solomon I. et al. |
| 5,380,362 A | 1/1995 | Schubert |
| 5,403,518 A | 4/1995 | Schubert |
| 5,573,711 A | 11/1996 | Hou et al. |
| 5,914,806 A | 6/1999 | Gordon, II et al. |
| 6,017,584 A | 1/2000 | Albert et al. |
| 6,751,007 B2 | 6/2004 | Liang et al. |
| 6,930,818 B1 | 8/2005 | Liang et al. |
| 7,038,670 B2 | 5/2006 | Liang et al. |
| 7,052,766 B2 | 5/2006 | Chen et al. |
| 7,079,303 B2 | 7/2006 | Hou et al. |
| 7,250,933 B2 | 7/2007 | De Boer et al. |
| 7,339,716 B2 | 3/2008 | Ding et al. |
| 2003/0169227 A1 | 9/2003 | Chen et al. |
| 2004/0030125 A1 | 2/2004 | Li et al. |
| 2004/0032389 A1* | 2/2004 | Liang et al. .................. 345/107 |
| 2004/0201567 A1 | 10/2004 | Yu et al. |
| 2005/0039274 A1 | 2/2005 | Yang et al. |

OTHER PUBLICATIONS

Allen, K. (Oct. 2003). Electrophoretics Fulfilled. *Emerging Displays Review: Emerging Display Technologies, Monthly Report*—Oct. 9-14, 2003.

Bardsley, J.N. & Pinnel, M.R. (Nov. 2004) Microcup™ Electrophoretic Displays. *USDC Flexible Display Report*, 3.1.2. pp. 3-12-3-16.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, 19.6.1.

(Continued)

*Primary Examiner* — Jerry Rahll
(74) *Attorney, Agent, or Firm* — Perkins Coie LLP.

(57) ABSTRACT

The present invention relates to reflective displays and processes for their manufacture.

12 Claims, 10 Drawing Sheets

OTHER PUBLICATIONS

Chen, S.M. (Jul. 2003) The Applications for the Revolutionary Electronic Paper Technology. *OPTO News & Letters*, 102, 37-41. (in Chinese, English abstract attached).

Chen, S.M. (May 2003) The New Applications and the Dynamics of Companies. *TRI*. 1-10. (in Chinese, English abstract attached).

Chung, J., Hou, J., Wang, W., Chu, L.Y., Yao, W., & Liang, R.C. (Dec. 2003). Microcup(R) Electrophoretic Displays, Grayscale and Color Rendition. *IDW*, AMD2/EP1-2, 243-246.

Dalisa, A. L., "Electrophoretic Display Technology", IEEE Trans. Electron Devices, ED-24, pp. 827-834 (1977).

Ho, Candice. (Feb. 1, 2005) *Microcupt® Electronic Paper Device and Applicaiton*. Presentation conducted at USDC 4th Annual Flexible Display Conference 2005.

Ho, C.,& Liang, R.C. (Dec. 2003). *Microcup (R) Electronic Paper by Roll-to-Roll Manufacturing Processes*. Presentation conducted at FEG, Nei-Li, Taiwan.

Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.

Lee, H., & Liang, R.C. (Jun. 2003) SiPix Microcup(R) Electronic Paper—An Introduction. *Advanced Display*, Issue 37, 4-9 (in Chinese, English abstract attached).

Liang, R.C. (Feb. 2003) *Microcup(R) Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Display/Electronic Paper—A Technology Overview*. Paper presented at the METS 2004 Conference in Taipie, Taiwan.

Liang, R.C., (Feb. 2005) *Flexible and Roll-able Displays/Electronic Paper—A Brief Technology Overview*. Flexible Display Forum, 2005, Taiwan.

Liang, R.C., Hou, J., Chung, J., Wang, X., Pereira, C., & Chen, Y. (2003). Microcup(R) Active and Passive Matrix Electrophoretic Displays by a Roll-to-Roll Manufacturing Processes. *SID Digest*, 20.1.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Zang, H.M., & Chung, J. (Feb. 2003). *Passive Matrix Microcup(R) Electrophoretic Displays*. Paper presented at the IDMC, Taipei, Taiwan.

Liang, R.C., Hou, J., Zang, H.M., Chung, J., & Tseng, S. (2003). Microcup(R) displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) << Format Flexible Microcup (R) Electronic Paper by Roll-to-Roll Manufacturing Process >>, Presentation conducted at the 14th FPD Manufacturing Technology EXPO & Conference.

Liang, R.C., & Tseng, S. (Feb. 2003). *Microcup(R) LCD, An New Type of Dispersed LCD by a Roll-to-Roll Manufacturing Process*. Paper presented at the IDMC, Taipei, Taiwan.

Murau and Singer, "The Understanding and Elimination of Some Suspension Instabilities in an Electrophoretic Displa"., J. Appl. Phys. 49(9), pp. 4820-4829, 1978.

Nikkei Microdevices. (Dec. 2002) Newly-Developed Color Electronic Paper Promises—Unbeatable Production Efficiency. *Nikkei Microdevices*, 3. (in Japanese, with English translation).

Wang, X., Kiluk, S., Chang, C., & Liang, R.C. (Feb. 2004). Mirocup (R) Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51.

Wang, X., Li, P., Sodhi, D., Xu, T. and Bruner, S. et al., (Feb. 2006) *Inkjet Fabrication of Multi-Color Microcup® Electrophorectic Display*. the Flexible Microelectronics & Displays Conference of U.S. Display Consortium.

Zang, H.M. (Feb. 2004). *Microcup Electronic Paper*. Presentation conducted at the Displays & Microelectronics Conference of U.S. Display Consortium, Phoenix, Arizona, USA.

Zang, H.M. (Oct. 2003). *Microcup (R) Electronic Paper by Roll-to-Roll Manufacturing Processes*. Presentation conducted at the Advisory Board Meeting, Bowling Green State University, Ohio, USA.

Zang, H.M.Hou, Jack, (Feb. 2005) *Flexible Microcup® EPD by RTR Process*. Presentation conducted at $2^{nd}$ Annual Paper-Like Displays Conference, Feb. 9-11, 2005, St. Pete Beach, Florida.

Zang, H.M, Hwang, J.J., Gu, H., Hou, J., Weng, X., Chen, Y., et al. (Jan. 2004). Threshold and Grayscale Stability of Microcup (R) Electronic Paper. *Proceeding of SPIE-IS&T Electronic Imaging, SPIE* vol. 5289, 102-108.

Zang, H.M., & Liang, R.C. (2003) Microcup Electronic Paper by Roll-to-Roll Manufacturing Processes. *The Spectrum*, 16(2), 16-21.

PCT/US06/13312 International Search Report, mailed Aug. 9, 2007.

* cited by examiner a(1)  a(2)

REFLECTIVE DISPLAYS AND PROCESSES FOR THEIR MANUFACTURE

This application claims the priorities under 35 USC 119(e) of U.S. Provisional Application No. 60/669,910, filed on Apr. 8, 2005. The whole content of the priority application is incorporated herein by reference in its entirety.

FIELD OF THE INVENTION

The present invention relates to reflective displays and processes for their manufacture.

BACKGROUND OF THE INVENTION

Electronic paper has been developed based on a variety of display technologies, such as the electrophoretic display, the nanochromic display, the electrodeposition display, the liquid powder display, the twisting ball display or the liquid crystal display technology.

One of the ways to achieve multi-color states in electronic paper is the use of color filters. In general, color filters are placed on the front surface of a display panel and they generate different image colors depending on each sub-pixel's "on" or "off" state. For a reflective display, ambient light strikes on the display surface, a contrast is created through the difference between the reflected light of the "on" sub-pixels and that of the "off" sub-pixels which absorb the light. With color filters in front of a display panel, the light passes through the color filters before it hits the "on" and "off" sub-pixels and the reflected light passes back through the color filters. Since a color filter has limited transmittance, usually a significant loss in reflectance is observed when the light passes through the color filter twice, thus a significant reduction in the contrast and color saturation of the display. Therefore, although color filters have been used in the display industry, they have had rather limited success in the reflective type displays. In addition, the high cost associated with the color filters is another disadvantage.

SUMMARY OF THE PRESENT INVENTION

One objective of the present invention is to provide cost effective reflective displays with high quality colors.

The present invention is directed to new designs of reflective displays which are applicable to most of display technologies.
reflective displays.

The second aspect of the invention is directed to the processes for the manufacture of such reflective displays.

The third aspect of the invention is directed to the configuration of display cells suitable for the reflective displays of the present invention.

The fourth aspect of the invention is directed to reflective direct drive (or segment) displays.

It is noted that the whole content of each document referred to in this application is incorporated by reference into this application in its entirety.

DETAILED DESCRIPTION OF THE PRESENT INVENTION

A detailed description of a preferred embodiment of the invention is provided below. While the invention is described in conjunction with the preferred embodiments, it should be understood that the invention is not limited to any one embodiment.

In the past, one approach to create a multi-color display is to use colored image forming fluids or colored filters. The present invention uses a new approach involving the use of a "dual reflective" mechanism to create color contrast with color enhancing elements in a display panel. In this "dual reflective" mechanism, the main reflection comes from the image forming elements (such as the highly scattering particles in an electrophoretic fluid) and the contrast color is created by the color enhancing elements impregnated within the image forming elements (such as units of the image forming electrophoretic fluid). By varying the area ratio of the color enhancing elements and the image forming elements of the display panel and through manipulation of the color of the color enhancing elements and the color of the image forming elements, the "dual reflective" mechanism can create a unique color sensation to the viewers with a good optical contrast.

When transparent components (for example, partition walls separating the units of the image forming fluid) are placed among units of the image forming fluid, the color enhancing function can be achieved by, for example, placing a colored enhancing layer behind the image forming elements. The transparent components allow light to penetrate through the opaque image forming elements to reach the color enhancing layer. Alternatively, the color enhancing function may be achieved by placing colored components among units of the image forming fluid. In this case, the combination of the scattering light from the image forming fluid and the reflected colors from the colored components would provide a variety of color tones.

It is noted that while the electrophoretic displays are specifically discussed in this application, the concept of the present invention is applicable to, and can be adapted to, other types of the display technology as well.

I. Design of Reflective Displays

Figure 1:
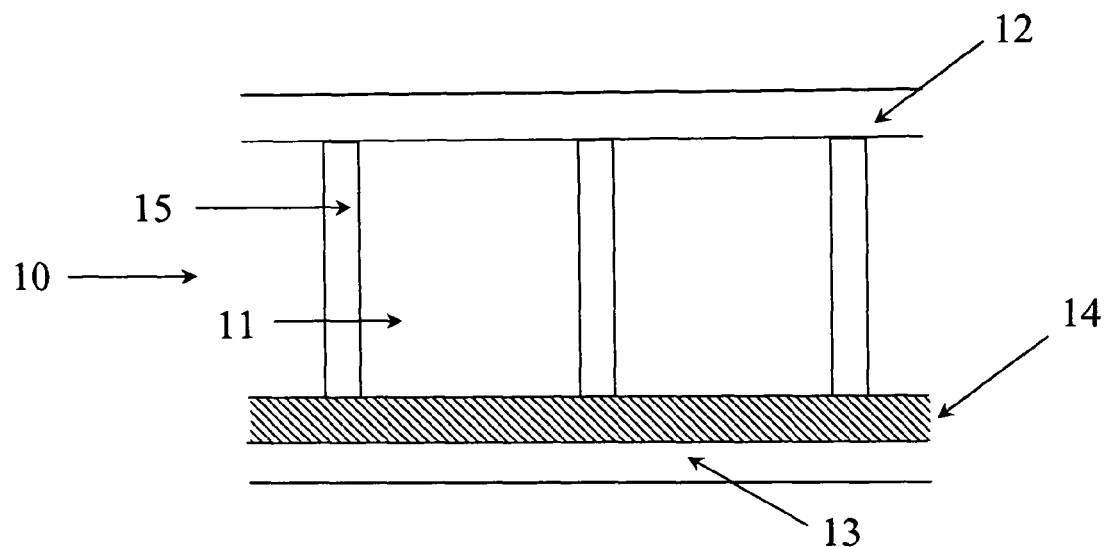
FIG. 1 illustrates a cross-section view of one design of the reflective displays of the present invention.

The first embodiment of the present invention is depicted in FIG. 1. This figure is a cross-section view of one design of the reflective displays of the present invention. The display panel (10) in FIG. 1 comprises an array of display cells (11) filled with a display fluid. The display panel (10) is sandwiched between a first electrode layer (12) and a second electrode layer (13). The display may be viewed from the side of the first electrode layer (12) or the second electrode layer (13). In other words, one of the two electrode layers (12 or 13) is transparent for viewing. A color enhancing layer (14) is placed between the display panel and one of the electrode layers and the color enhancing layer (14) is on the non-viewing side.

In one embodiment of this design, the second electrode layer (13) may have a reflective surface. Alternatively, there may be a reflector (not shown) placed between the color enhancing layer (14) and the second electrode layer (13). Further alternatively, there may be a reflector (not shown) placed behind the second electrode layer (13), if the second electrode layer is transparent or semi-transparent.

It is also possible that the color enhancing layer (14) itself has reflective characteristics.

The partition walls (15), which may also be referred to as "streets", separate the display cells. In the context of the present invention, the partition walls (or streets) may be transparent, semi-transparent, translucent or semi-translucent.

In FIG. 1, if the first electrode layer (12) is the viewing side and the color enhancing layer (14) is between the display panel (10) and the second electrode layer (13), the color of the color enhancing layer may be transmitted through the streets to the viewer.

The electrode layers (12 and 13) may be electrode layers having conductive lines formed thereon. When the electrode layer is transparent, the electrode layer is usually formed from ITO (indium tin oxide).

For a direct drive display, one of the electrode layers is a common electrode layer and the other electrode layer is a backplane comprising segment pixels. In other words, the display panel (10) is sandwiched between a common electrode layer and a backplane. The common electrode layer is usually the viewing side. The backplane may be formed from a flexible or rigid printed circuit board. The color enhancing layer, in this case, is between the display panel and the backplane. As discussed above, the backplane may have a reflective surface. Alternatively, there may be a reflector placed between the color enhancing layer (14) and the backplane. Further alternatively, the color enhancing layer itself may have reflective characteristics.

The color enhancing layer (14) may be formed of a polymeric material. The materials used for the formation of the display cells (i.e., microcups) described below are also suitable for the formation of the color enhancing layer.

The color enhancing layer may have a thickness in the range of about 0.5 um to about 10 um, preferably in the range of about 1 um to about 5 um.

The color enhancing layer may be an adhesive layer. Preferred materials for such an adhesive layer may be formed from one adhesive or a mixture thereof, such as pressure sensitive, hot melt or radiation curable adhesive. Specific adhesive materials may include, but are not limited to, acrylics, styrene-butadiene copolymers, styrene-butadiene-styrene block copolymers, styrene-isoprene-styrene block copolymers, polyvinylbutyral, cellulose acetate butyrate, polyvinylpyrrolidone, polyurethanes, polyamides, ethylene-vinylacetate copolymers, epoxides, multifunctional acrylates, vinyls, vinylethers, and oligomers, polymers or copolymers thereof. Adhesives comprising polymers or oligomers having a high acid or base content such as polymers or copolymers derived from acrylic acid, methacrylic acid, itaconic acid, maleic anhydride, vinylpyridine or a derivative thereof are particularly useful.

The color enhancing layer comprises a dye or pigment or a mixture of dyes or pigments. Any dyes or pigments which are soluble or dispersible in a composition for the formation of the color enhancing layer may be used. Most of suitable dyes or pigments are commercially available, from companies such as Sun Chemical, BASF, Ciba Specialty Chemicals, Clariant, Daicolor-Pope or Bayer, just to name a few. Specific examples of suitable dyes or pigments may include, but are not limited to, Cu phthalocyanine, quinacridone, benzimidazolone or carbon black.

The color enhancing layer (14) may be applied to the electrode layer (13) by laminating, direct printing, coating, screen printing, stamping or other equivalent means.

Alternatively, the color enhancing layer (14) may also be laminated, directly printed, coated, screen printed, stamped (or by other equivalent means) onto one side of a release liner. The release liner with the color enhancing layer is then laminated onto the electrode layer with the color enhancing layer in contact with the electrode layer, followed by removing the release liner.

Further alternatively, the release liner with the color enhancing layer may be laminated onto a display panel with the color enhancing layer in contact with the display panel, followed by removing the release layer. The display panel with the color enhancing layer is then laminated onto the electrode layer to form a composite layer with the color enhancing layer in between the electrode layer and the display panel.

For illustration purpose, a display panel formed from the microcup technology as disclosed in U.S. Pat. No. 6,930,818 (corresponding to WO 01/67170), the content of which is incorporated herein by reference in its entirety, is presented. A typical microcup-based display panel is depicted in FIG. 2.

Figure 2:
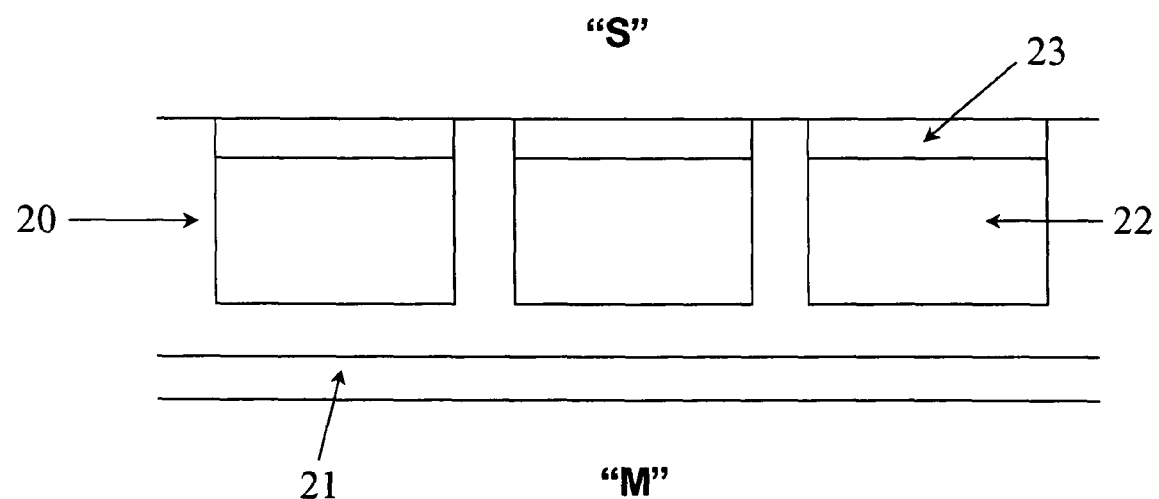
FIG. 2 illustrates a typical microcup-based display panel.

The microcups (20) may be formed by microembossing or photolithography, directly on the color enhancing layer (14) of FIG. 1 or separately on a non-conductive substrate layer (21) as shown in FIG. 2.

Suitable materials for the formation of the microcups may include, but are not limited to, thermoplastic or thermoset precursors, in particular, multifunctional acrylates, methacrylates, vinylethers, epoxides and oligomers or polymers thereof. Multifunctional acrylates and oligomers thereof are more preferred. A combination of a multifunctional epoxide and a multifunctional acrylate is also useful to achieve desirable physico-mechanical properties of the microcups. The glass transition temperature (or Tg) of the materials suitable for the formation of microcups may range from about $-70°$ C. to about $150°$ C., preferably from about $-20°$ C. to about $50°$ C.

The microcups are then filled with a display fluid (22) and sealed with a polymeric sealing layer (23). The filling and sealing methods are also disclosed in U.S. Pat. No. 6,930,818 (corresponding to WO 01/67170). Briefly, the polymeric sealing layer may be hardened in situ. The sealing composition used for the formation of the polymeric sealing layer, according to U.S. Pat. No. 6,930,818, preferably has a specific gravity lower than that of the display fluid.

If prepared separately, the microcup-based display panel may be laminated onto the color enhancing layer (14) in FIG. 1 from the sealing layer side (marked "S" in FIG. 2). Alternatively, the display panel may be laminated onto the color enhancing layer from the microcup side (marked "M" in FIG. 2) after the non-conductive substrate layer (21) is removed.

After the display panel is in place, another electrode layer (e.g., 12 in FIG. 1) is then laminated over the display panel (10), optionally with an adhesive layer.

While microcups are used to illustrate the invention, it is understood that all of the designs of the present invention are applicable to other types of display technology. For example, the design of FIG. 1 is applicable to other types of display technology, as long as the display cells are partitioned by walls or spacers which are transparent, semi-transparent, translucent or semi-translucent. The present design is also applicable to display panel having display cells embedded in a polymer matrix which is transparent, semi-transparent, translucent or semi-translucent.

For example, the design of FIG. 1 may be applied to the fast response liquid powder display which comprises partition walls similar to those of the microcup structure. Accordingly, the color enhancing layer can also be used in such type of displays to form reflective displays based on different image color combinations as described below.

In another example, reflective displays with microcapsule-based display cells embedded in a polymer matrix or partitioned by spacers may also be formed utilizing the same approach as described below, if the polymer matrix or spacers is transparent, semi-transparent, translucent or semi-translucent.

For an electrophoretic display, the display cells are filled with charged pigment particles dispersed in a dielectric solvent or solvent mixture. The electrophoretic display fluid may be prepared according to methods well known in the art, such as U.S. Pat. Nos. 6,017,584, 5,914,806, 5,573,711, 5,403,518, 5,380,362, 4,680,103, 4,285,801, 4,093,534, 4,071,430, 3,668,106 and *IEEE Trans. Electron Devices*, ED-24, 827 (1977), and *J. Appl. Phys.* 49(9), 4820 (1978). The charged pigment particles visually contrast with the dielectric solvent or solvent mixture in which the charged particles are dispersed. The dielectric solvent or solvent mixture preferably has a low viscosity and a dielectric constant in the range of about 2 to about 30 for high particle mobility. Examples of suitable dielectric solvents may include, but are not limited to, hydrocarbons such as decahydronaphthalene (DECALIN), 5-ethylidene-2-norbornene, fatty oils, paraffin oil, aromatic hydrocarbons, such as toluene, xylene, phenylxylylethane, dodecylbenzene and alkylnaphthalene, halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane, pentachlorobenzene, and perfluorinated solvents such as FC-43, FC-70 and FC-5060 from 3M Company, St. Paul Minn., low molecular weight halogen containing polymers such as poly (perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Delaware. In one embodiment, poly(chlorotrifluoroethylene) is used as the dielectric solvent. In another embodiment, poly(perfluoropropylene oxide) is used as the dielectric solvent.

The dielectric solvent or solvent mixture medium may be colored by dyes or pigments (hereinafter referred to as the "dye solution"). Nonionic azo and anthraquinone dyes are particularly useful. Examples of useful dyes may include, but are not limited to, Oil Red EGN, Sudan Red, Sudan Blue, Oil Blue, Macrolex Blue, Solvent Blue 35, Pylam Spirit Black and Fast Spirit Black from Pylam Products Co., Arizona, Sudan Black B from Aldrich, Thermoplastic Black X-70 from BASF, anthroquinone blue, anthroquinone yellow 114, anthroquinone red 111, 135, anthroquinone green 28 from Aldrich. Other suitable pigments and dyes include those disclosed in U.S. Ser. Nos. 10/439,428 (corresponding to WO 03/097747) and 10/903,923 (corresponding to WO 05/17046), the contents of which are incorporated herein by reference in their entirety.

In case of an insoluble pigment, the pigment particles for generating the color of the dye solution may also be dispersed in the dielectric solvent or solvent mixture. These color particles are preferably uncharged. If the pigment particles for generating color in the dye solution are charged, they preferably carry a charge which is opposite from that of the charged pigment particles. If both types of pigment particles carry the same charge, then they should have different charge density or different electrophoretic mobility. In any case, the dye or pigment for generating color of the dye solution must be chemically stable and compatible with other components in the electrophoretic fluid.

The charged pigment particles may be positively or negatively charged. They may be organic or inorganic pigments, such as $TiO_2$, phthalocyanine blue, phthalocyanine green, diarylide yellow, diarylide AAOT yellow, and quinacridone, azo, rhodamine, perylene pigment series from Sun Chemical, Hansa yellow G particles from Kanto Chemical or Carbon Lampblack from Fisher. The particles should have acceptable optical characteristics, should not be swollen or softened by the dielectric solvent or solvent mixture, and should be chemically stable. The resulting fluid must also be stable against sedimentation, creaming or flocculation under normal operating conditions.

Suitable electrophoretic display fluids may be manufactured by any of the well-known methods including grinding, milling, attriting, microfluidizing and ultrasonic techniques.

Sedimentation or creaming of the pigment particles may be minimized by microencapsulating the particles with suitable polymers to match the specific gravity to that of the dielectric solvent or solvent mixture. Microencapsulation of the pigment particles may be accomplished chemically or physically. Typical microencapsulation processes include interfacial polymerization, in-situ polymerization, phase separation, coacervation, electrostatic coating, spray drying, fluidized bed coating and solvent evaporation. The microencapsulation process as discloses in U.S. Ser. No. 10/335,210 (corresponding to WO 03/58335), 10/335,051 (corresponding to WO 03/57360) and 10/632,171 (corresponding to WO 04/12001), the contents of all of which are incorporated herein by reference in their entirety, are also suitable.

The charged pigment particles, the dye solution and the color enhancing layer may be of any color combinations. However, in the context of the present invention, if the charged pigment particles are of the white color, the dye solution is preferably a dark neutral color, such as black, near black, dark grey, grey or dark green, in order to achieve a better visual image contrast. For a grey/white color combination, the electrophoretic fluid may comprise charged white particles of titanium oxide ($TiO_2$) dispersed in a grey-color dye solution. A black dye or pigment, such as Pylam Spirit Black and Fast Spirit Black from Pylam Products Co. Arizona, Sudan Black B from Aldrich, Thermoplastic Black X-70 from BASF or an insoluble black pigment such as carbon black may be used to generate the grey-color of the dye solution. Another approach to generate a grey-color dye solution is to use a mixture of dyes or pigments such as cyan, yellow and magenta colored dyes or pigments in a dielectric solvent or solvent mixture.

For other colored electrophoretic fluids, there are many possibilities. For a subtractive color system, the charged particles may be dispersed in a dye solution of cyan, yellow or magenta color. The cyan, yellow or magenta color may be generated via the use of a dye or a pigment. For an additive color system, the charged particles may be dispersed in a dye solution of red, green or blue color, generated also via the use of a dye or a pigment.

FIGS. 3A-3D illustrate the reflective displays of the first embodiment of the present invention, as described above. For the purpose of illustration of the figures, it is assumed that the charged pigment particles are of the white color and positively charged, the dye solution is of a grey color and the color enhancing layer is of a red color. The first electrode layer (32) is the viewing side.

Figure 3A:
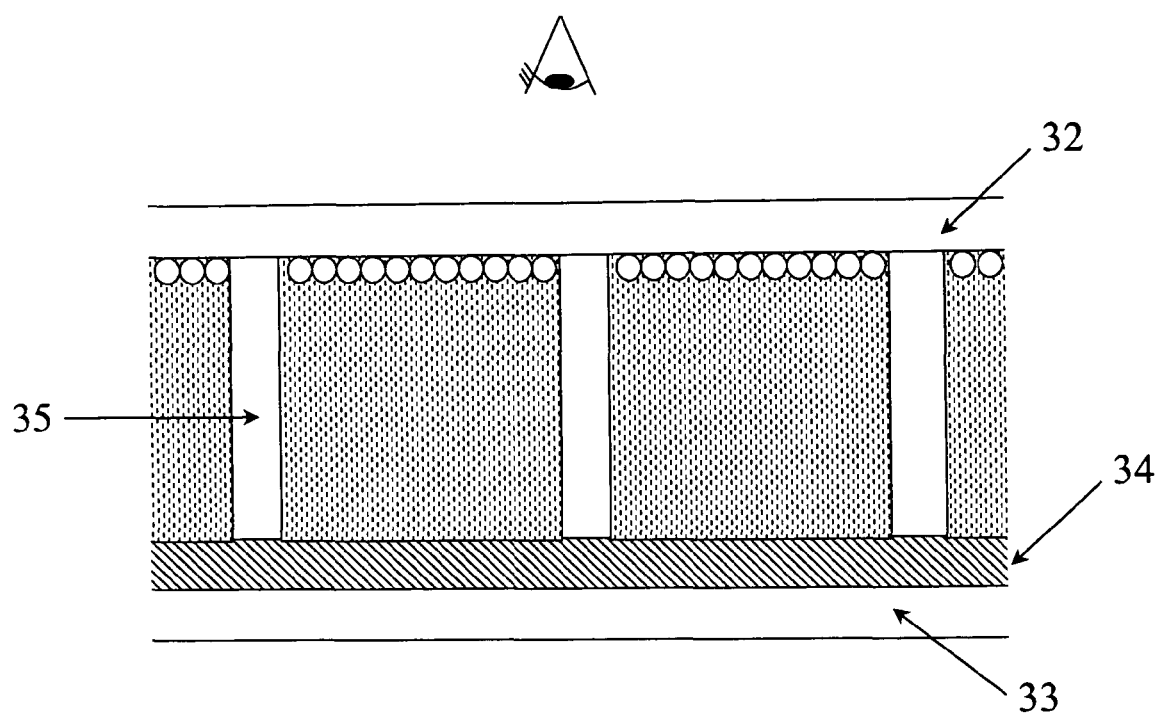
FIGS. 3A-3D illustrate one design of reflective displays of the present invention.
Figure 3B:
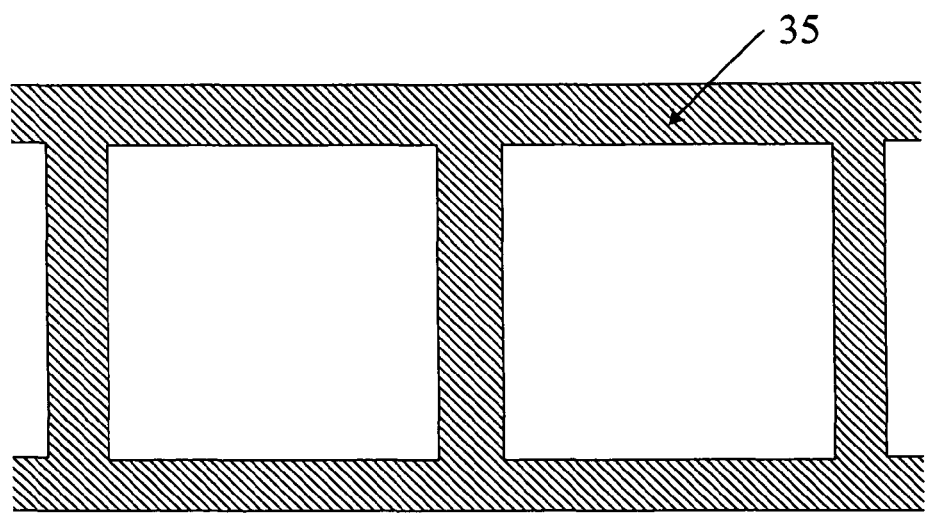

In FIG. 3A, the voltage of the first electrode layer (32) is set low and the voltage of the second electrode layer (33) is set high. Because of the voltage difference, the positively charged white particles migrate to, and gather at, the first electrode (32). The red color of the color enhancing layer (34) is transmitted through the streets (35). FIG. 3B is a top view of the FIG. 3A from the viewing side. As a result of the white color (i.e., the color of the particles) and the red color (the color seen through the streets) seen simultaneously by the viewer from the viewing side, a white color with a slight tint of red is perceived visually.

Figure 3C:
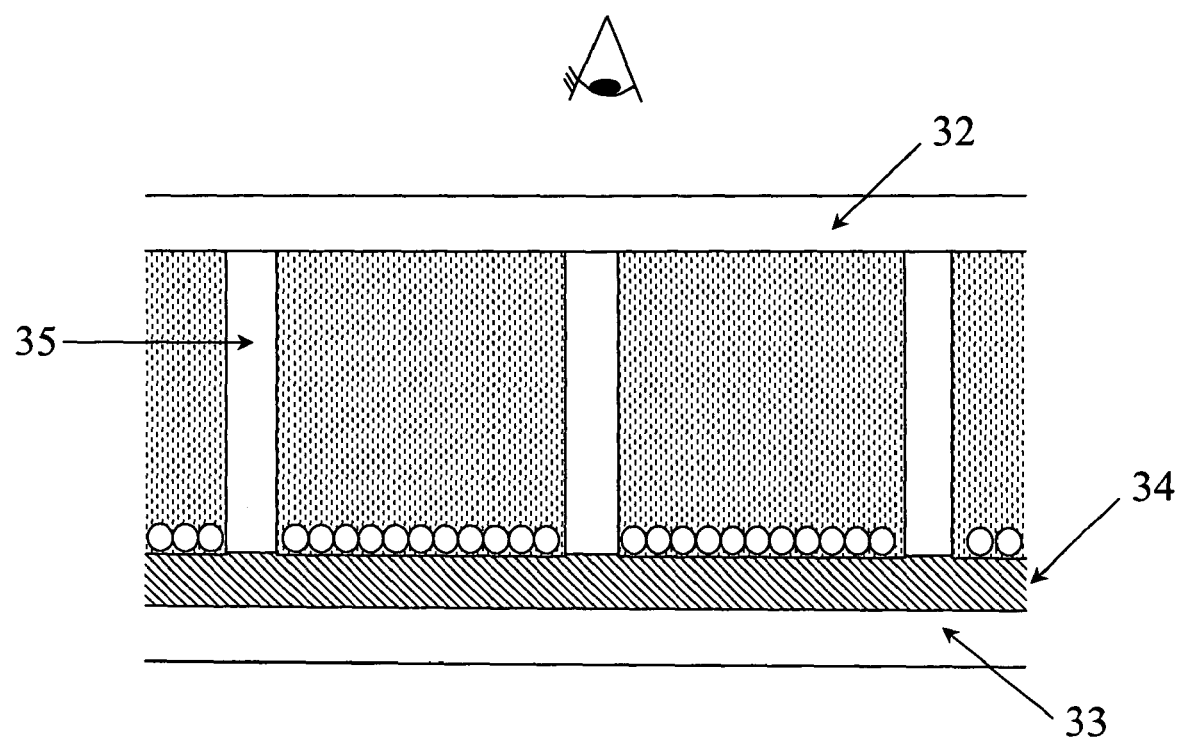
Figure 3D:
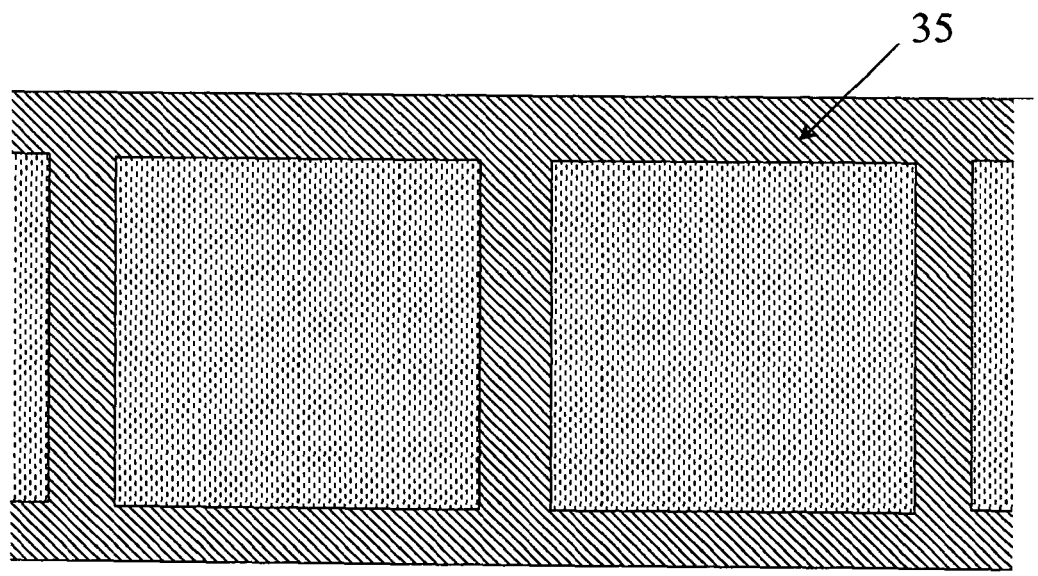

In FIG. 3C, the voltage of the first electrode layer (32) is set high and the voltage of the second electrode layer (33) is set low. Because of the voltage difference, the positively charged white particles migrate to, and gather at, the second electrode (33). Therefore from the viewing side, the display cells will display the color of the dye solution, i.e., grey. FIG. 3D is a top view of the FIG. 3C from the viewing side. As a result of the grey color (i.e., the color of the dye solution) and the red color (the color seen through the streets) seen simultaneously by a viewer from the viewing side, a grayish red color is perceived visually.

FIGS. 3A-3D illustrate that a two color system (white on red or red on white) is possible with the present invention, which may be extended to white/green, white/blue and other color combinations by selecting appropriate color combinations of the charged pigment particles, the dye solution and the color enhancing layer.

Figure 4:
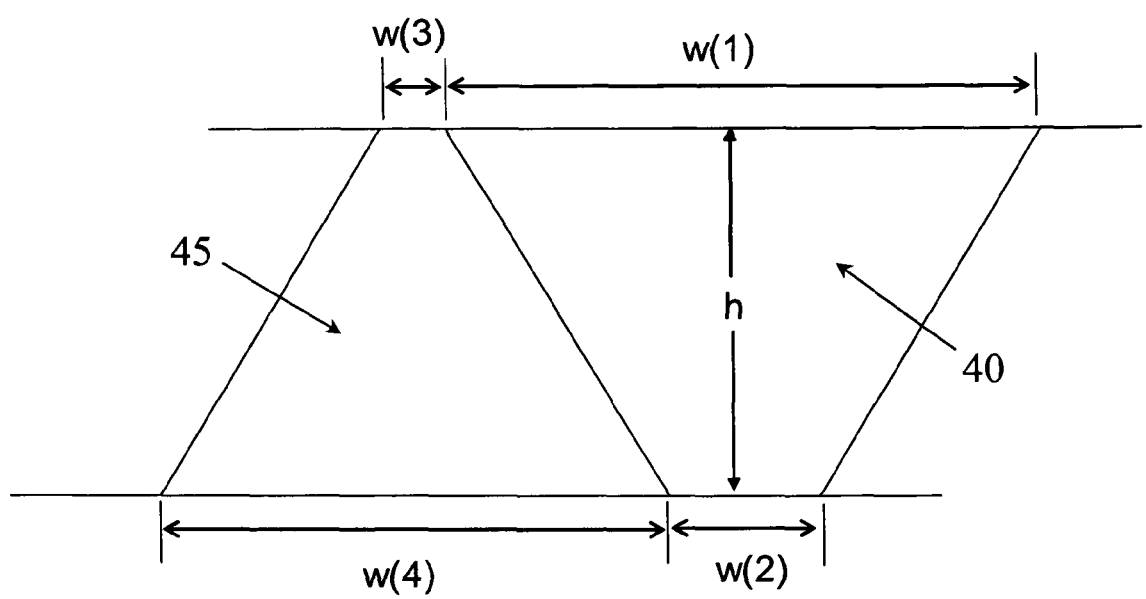
FIG. 4 illustrates the configuration of display cells suitable for the present invention.

In order to enhance the color saturation, the shape and dimension of display cells may be modified to improve the color penetration from the color enhancing layer. FIG. 4 illustrates the configuration of the display cells designed for this purpose. As shown in FIG. 4, the shape of display cells (40) is modified to have the top width ("w(1)") longer than the bottom width ("w(2)"). Therefore the display cells have the shape of a trapezoid with the top parallel line longer than the bottom parallel line.

The ratio of w(1) to w(2) is preferably in the range of about 1.01 to about 10, more preferably in the range of about 1.5 to about 5. The length of w(1) is preferably in the range of about 50 to about 250 um, more preferably in the range of about 80 to about 200 um. The length of w(2) is preferably in the range of about 5 to about 100 um, more preferably in the range of about 10 to about 80 um. The thickness of the display panel (i.e., the height of the display cells, "h") is usually in the range of about 3 to about 40 um, preferably in the range of about 10 to about 30 um.

Consequently, the streets or partition walls (45) have a shape of a trapezoid with the top parallel line shorter than the bottom parallel line. The top width ("w(3)") of the streets is shorter than the bottom width ("w(4)") of the streets. The ratio of w(3) to w(4) is preferably in the range of about 0.99 to about 0.1, more preferably in the range of about 0.7 to about 0.2. In general, the length of w(3) is preferably in the range of about 2 to about 40 um, more preferably in the range of about 5 to about 30 um. The length of w(4) is preferably in the range of about 10 to about 100 um, more preferably in the range of about 20 to about 60 um.

Figure 5A:
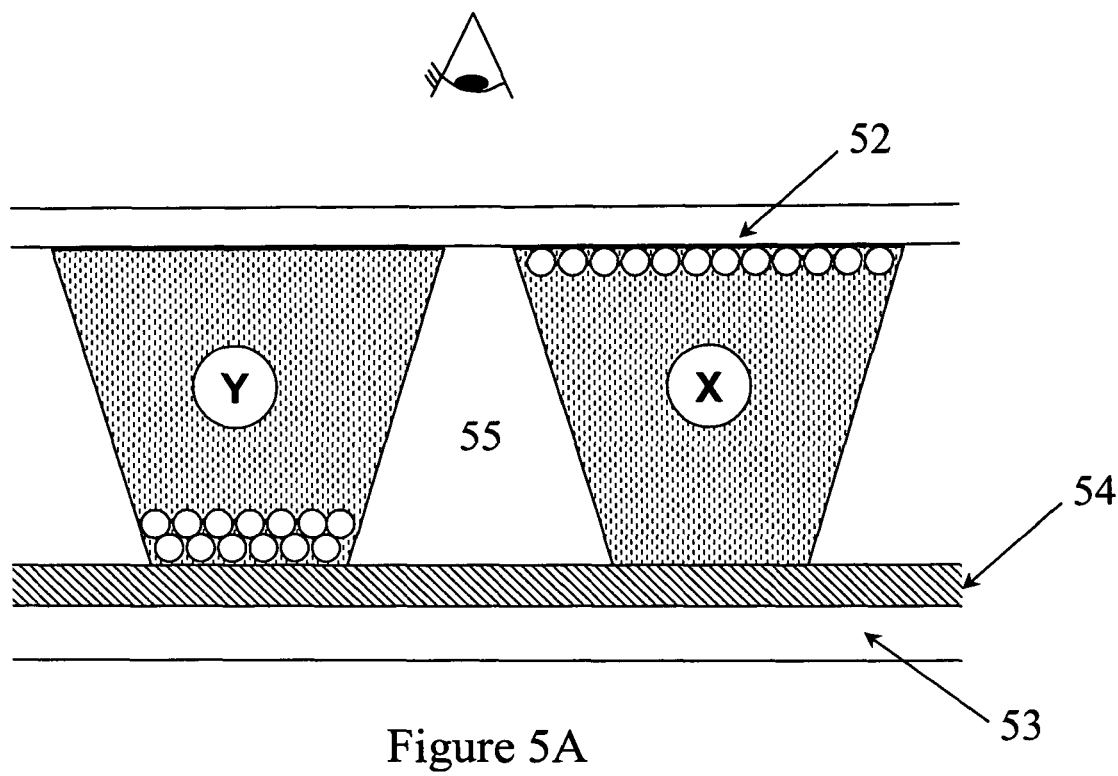
FIGS. 5A and 5B illustrate a reflective display with the display cell configuration of FIG. 4.
Figure 5B:
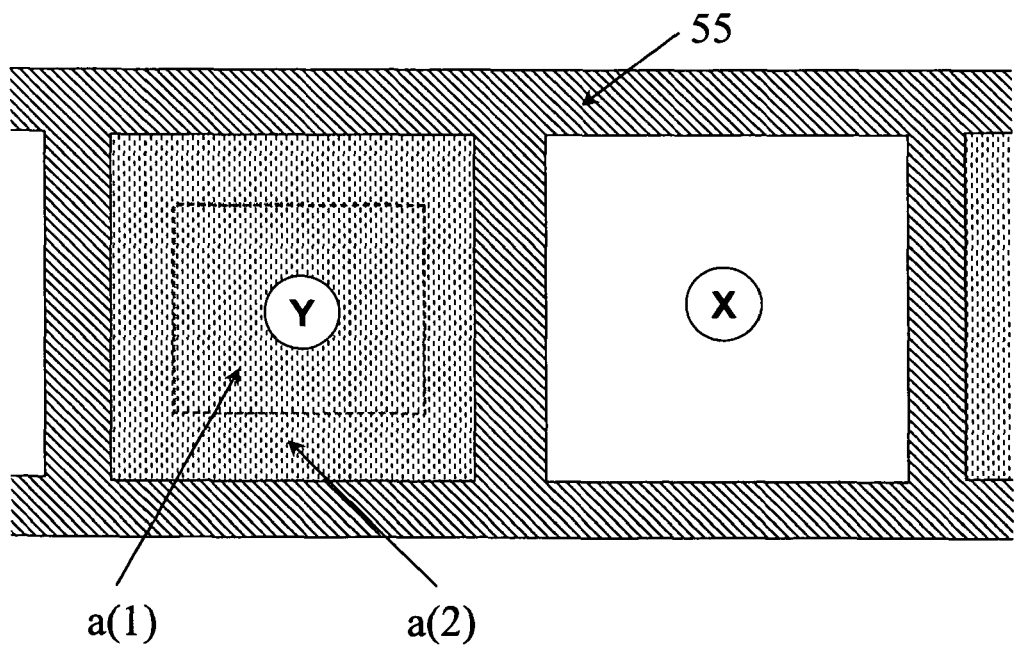

FIGS. 5A and 5B illustrate a reflective display of the present invention with the display cell configuration of FIG. 4. For illustration purpose, it is assumed that the charged pigment particles are of the white color and positively charged, the dye solution is of a grey color and the color enhancing layer (54) is of a red color. The first electrode layer (52) is the viewing side.

FIG. 5A is a cross-section view of a display panel of the configuration shown in FIG. 4 and FIG. 5B shows the top view.

In FIG. 5A, when the positively charged particles migrate to, and gather at, the first electrode (52), as shown in cell X, visually a white color with a slight tint of red is perceived by the viewer from the viewing side. However when the charged particles migrate to, and gather at, the second electrode layer (53) as shown in cell Y, the color seen from the top opening the cell will have different shades. For example, in the center area ("a(1)"), the color seen is the color of the dye solution (i.e., grey) and in the area ("a(2)") surrounding the central area ("a(1)"), the colors seen would be composite or midtone shades of the color of the dye solution and the color of the color enhancing layer. In the example illustrated, the color in area "a(2)" close to the center area "a(1)" would be a composite or midtone shade of more of the grey color and the red color and the color in area "a(2)" further away from the center area "a(1)" would be a composite or midtone shade of less of the grey color and the red color. However, visually a grayish red color is perceived, from cell Y, from the viewing side.

II. Alternative Design of Reflective Displays

Figure 6A:
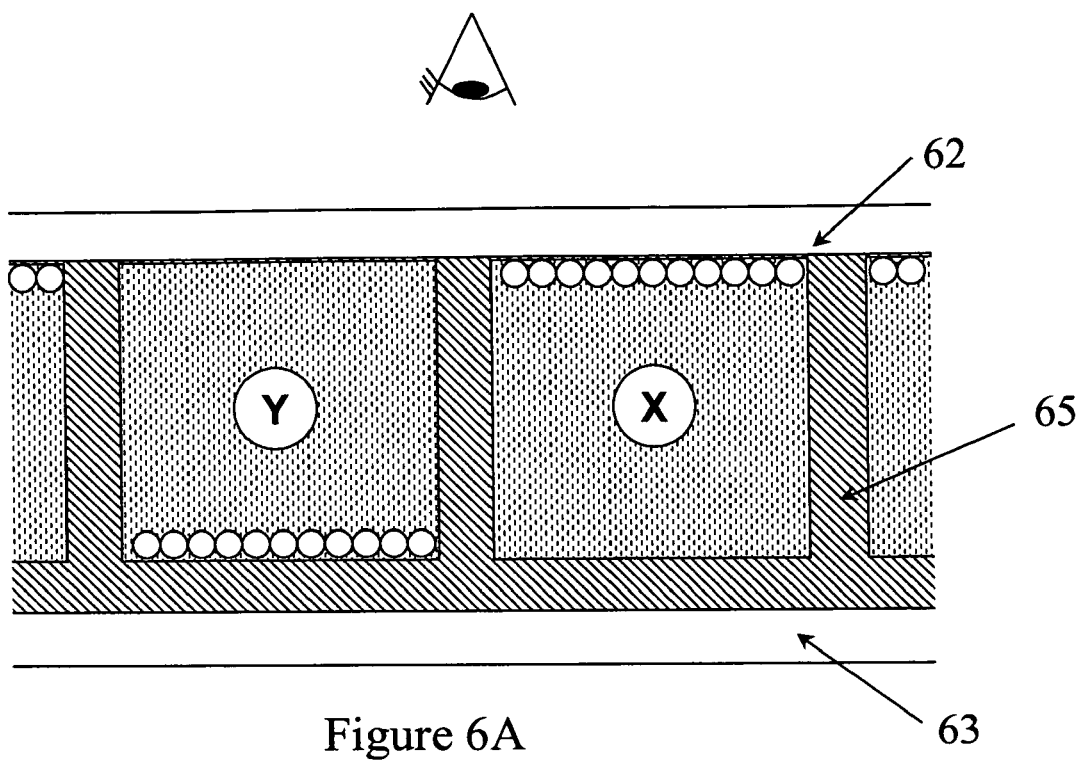
FIGS. 6A and 6B illustrate an alternative design of reflective displays of the present invention.

An alternative design of reflective displays is depicted in FIG. 6A. In this design, the color enhancing layer is eliminated. Instead, the display cells are formed from a colored material. For the microcup-based display panel, the microcups may be formed from any of the materials described above with a dye or pigment or a mixture of dyes or pigments dissolved or dispersed therein. Suitable dyes and pigments are also described above.

Figure 6B:
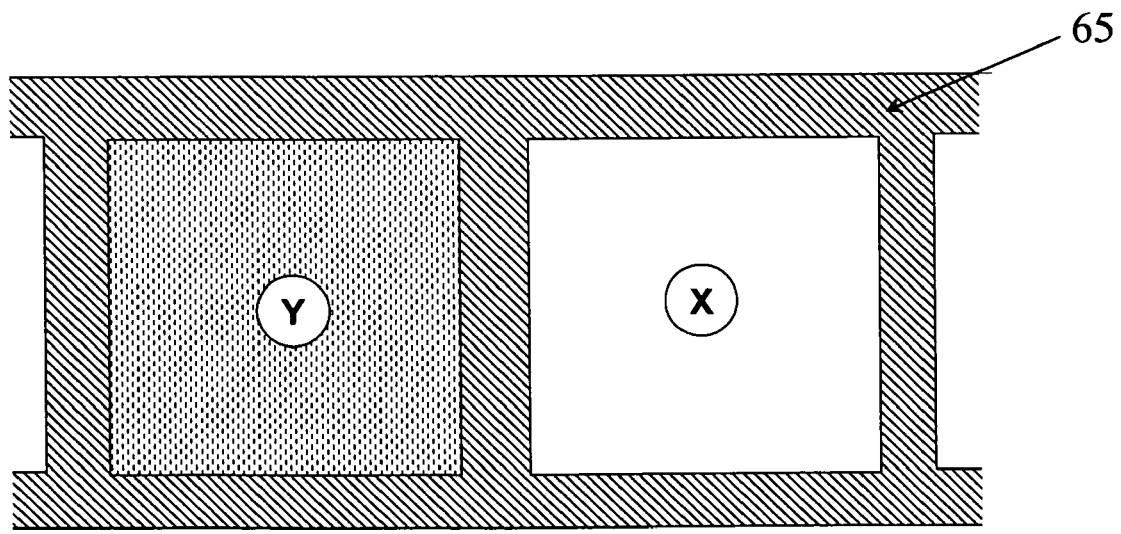

FIG. 6B is the top view of the reflective display of FIG. 6A. When the reflective display is an electrophoretic display, this alternative design works similarly to those described in FIGS. 3A-3D.

For the purpose of illustration of the figures, it is assumed that the charged pigment particles are of the white color and positively charged, the dye solution is of a grey color and the display cells are formed from a material of a red color. The first electrode layer (62) is the viewing side.

When the voltage of the first electrode layer (62) is set low and the voltage of the second electrode layer (63) is set high, because of the voltage difference, the positively charged white particles migrate to, and gather at, the first electrode (62). The red color of the partition walls of the display panel and the white color of the charged pigment particles, in this scenario, are seen simultaneously by the viewer from the viewing side. As a result, a white color with a slight tint of red is perceived visually, from cell X.

When the voltage of the first electrode layer (62) is set high and the voltage of the second electrode layer (63) is set low, because of the voltage difference, the positively charged white particles migrate to, and gather at, the second electrode (63). Therefore from the viewing side, the display cells will display the color of the dye solution, i.e., grey. However, as a result of the grey color of the dye solution and the red partition wall color seen simultaneously by a viewer from the viewing side, a grayish red color is perceived visually, from cell Y.

In one embodiment of this design, the second electrode layer (63) may have a reflective surface. Alternatively, there may be a reflector (not shown) placed between the display panel and the second electrode layer (63). Further alternatively, a reflector may be placed behind the second electrode layer (63), if the second electrode layer is transparent or semi-transparent.

This alternative design also provides a two color system as described by selecting appropriate color combinations of the charged pigment particles, the dye solution and the color of the display cell structure.

Figure 7A:
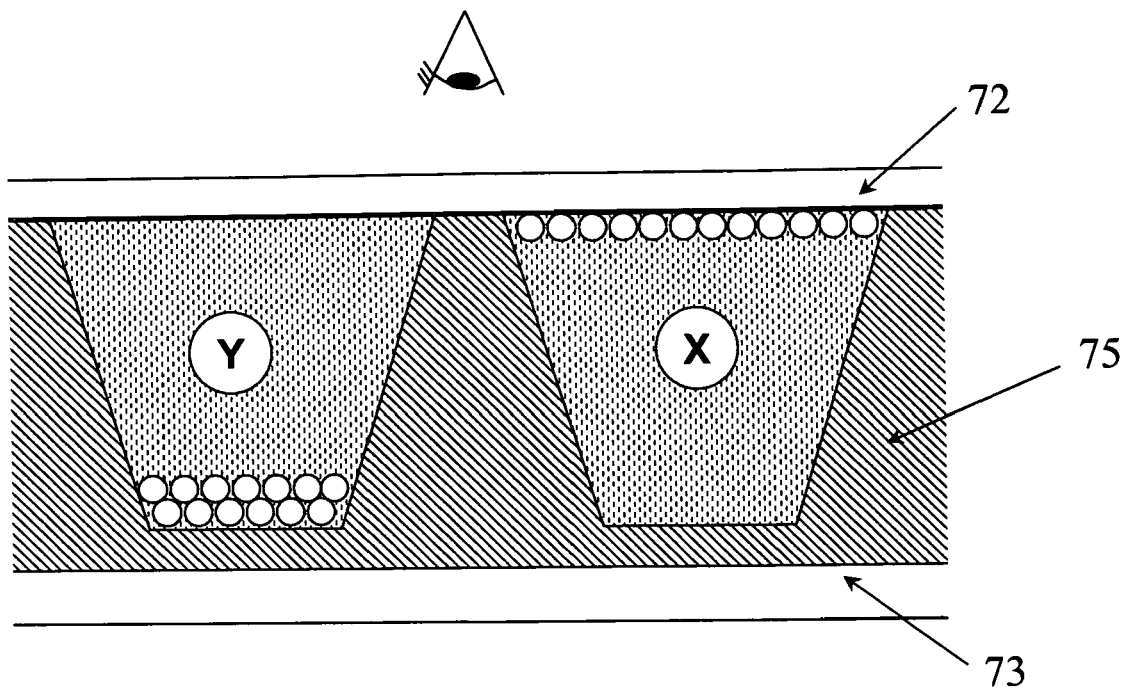
FIGS. 7A and 7B illustrate another reflective display with the display cell configuration of FIG. 4.
Figure 7B:
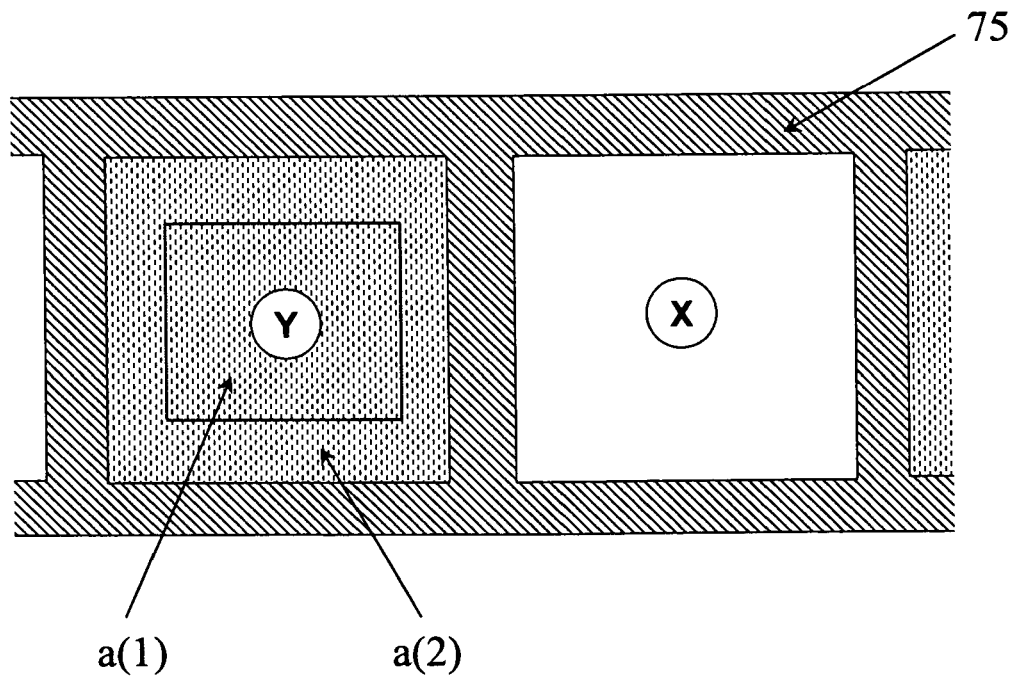

FIGS. 7A and 7B illustrate a reflective display of this alternative design with the new display cell configuration as described in FIG. 4. For illustration purpose, it is assumed that the charged pigment particles are of the white color and positively charged, the dye solution is of a grey color and the color of the display cell structure including the partition walls (75) is of a red color. The first electrode layer (72) is the viewing side.

FIG. 7A is a cross-section view of a display panel having the configuration as described in FIG. 4 and FIG. 7B shows a top view.

In FIG. 7A, when the positively charged particles migrate to, and gather at, the first electrode (72), as shown in cell X, visually a white color with a slight tint of red is perceived by the viewer from the viewing side. However when the positively charged particles migrate to, and gather at, the second electrode layer (73) as shown in cell Y, the color seen from the top opening the cell will have different shades. For example, in the center area ("a(1)"), the color seen is the color of the dye solution (i.e., grey) and in the area ("a(2)") surrounding the central area ("a(1)"), the colors seen would be composite or midtone shades of the color of the dye solution and the color of the display cell structure. In the example illustrated, the color in area "a(2)" close to the center area "a(1)" would be a composite or midtone shade of more grey and less red and the color in area "a(2)" further away from area "a(1)" would be a composite or midtone shade of less grey and more red. However, visually a grayish red color is perceived, from cell Y, from the viewing side.

III. Further Alternative Design of Reflective Displays

Figure 8A:
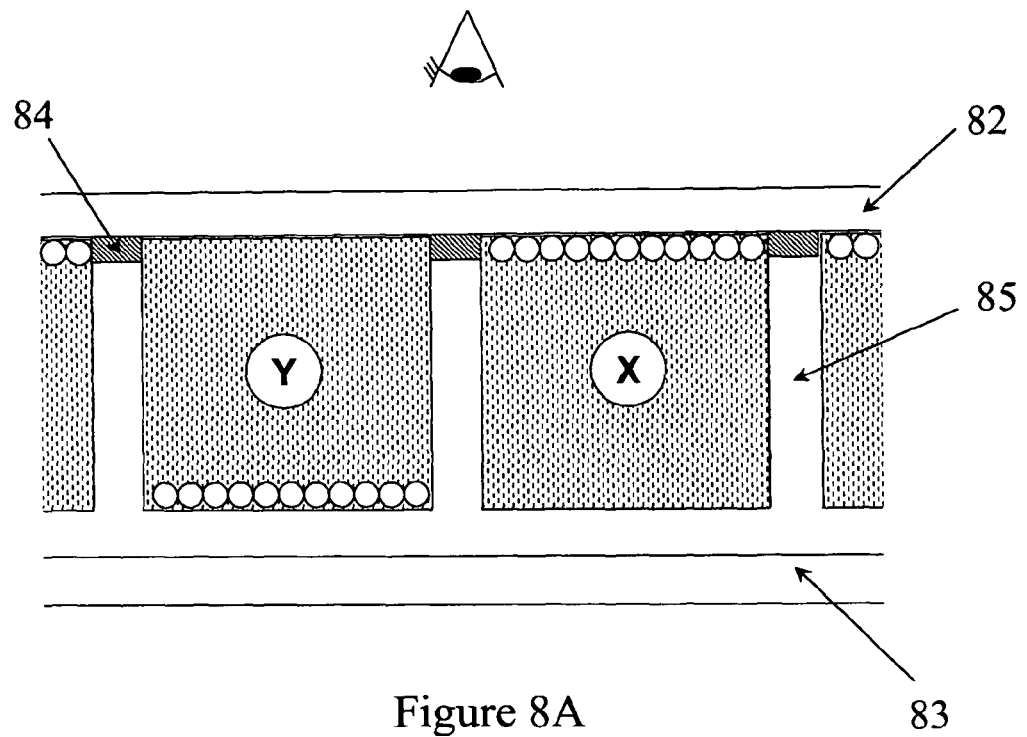
FIGS. 8A and 8B illustrate a further alternative design of reflective displays of the present invention.
Figure 8B:
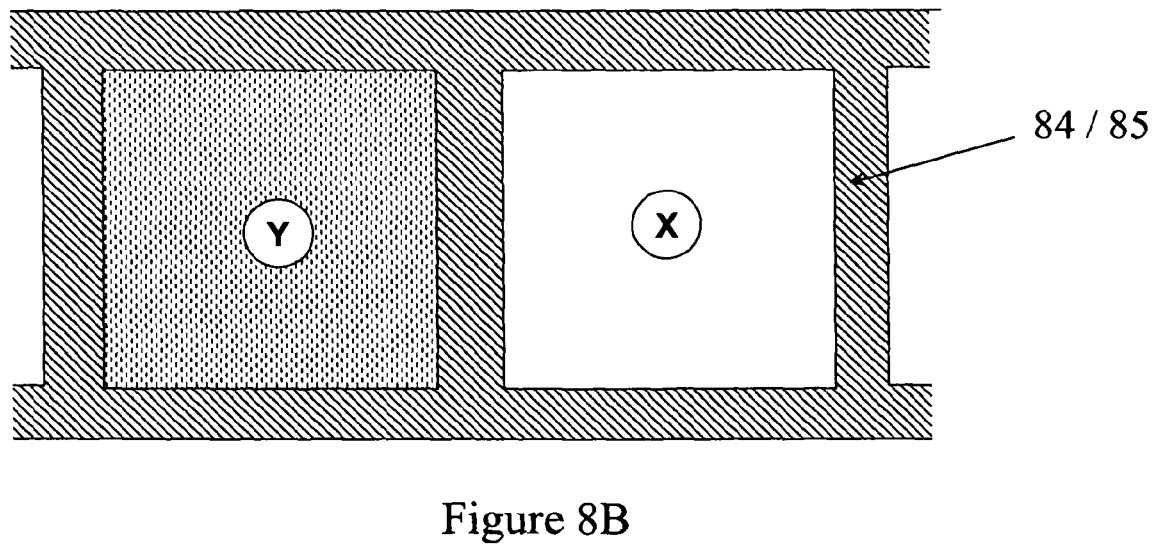

A further alternative design is depicted in FIG. 8A. In this design, the color enhancing layer shown in FIG. 1 is also eliminated. Instead, color enhancing layers (84) are printed or laminated, with registration, on the top surface of the partition walls (85). FIG. 8B is the top view of the design of FIG. 8A.

The openings of the display cells or areas corresponding to the openings of the display cells are not covered by the color enhancing layers.

The color enhancing layers (84) may be applied by a method such as printing, stamping, photolithography, vapor deposition or sputtering with a shadow mask. Depending on the material of the color enhancing layers and the process used to dispose the color enhancing layers, the thickness of the layer may vary from about 0.005 μm to about 10 μm, preferably from about 0.01 μm to about 5 μm.

In one embodiment, thin colored layers may be transferred onto the top surface of the partition walls (85) by an offset rubber roller or stamp. After the transferred coating or ink is hardened, the display cells may be subsequently filled. In this case, the color enhancing layers must be resistant to the solvent(s) used in both the electrophoretic fluid and the sealing composition, if applicable.

In another embodiment, the color enhancing layers may be applied, with registration, to the partition walls by a photolithography method in which a photosensitive color substance may be coated onto the top surface of the partition walls and exposed imagewise, with registration, through a photomask. The photosensitive color substance may be a positively-working or negatively-working resist. When a positively-working resist is used, the photomask should have openings corresponding to the display cell areas. In this scenario, the photosensitive color substance in the display cell areas (exposed) is removed by a developer after exposure.

If a negatively-working resist is used, the photomask should have openings corresponding to the top surface of the partition walls. In this scenario, the photosensitive color substance in the display cell areas (unexposed) is removed by a developer after exposure. The solvent(s) used to apply the color substance and the developer(s) for removing the substance should be carefully selected so that they do not attack the display cell structure.

Alternatively, a colorless photosensitive ink-receptive layer may be applied onto the top surface of the partition walls followed by exposure through a photomask. If a positively-working photosensitive latent ink-receptive layer is used, the photomask should have openings corresponding to the top surface of the partition walls. In this scenario, after exposure, the exposed areas become ink-receptive or tacky and color enhancing layers may be formed on the exposed areas (the top surface of the partition walls) after a color ink or toner is applied onto those areas. Alternatively, a negatively-working photosensitive ink-receptive layer may be used. In this case, the photomask should have openings corresponding to the display cells and after exposure, the exposed areas (the display cell areas) are hardened while color enhancing layers may be formed on the unexposed areas (the top surface of the partition walls) after a color ink or toner is applied onto those areas. The color enhancing layers may be post cured by heat or flood exposure to improve the film integrity and physico-mechanical properties.

In another embodiment, the color enhancing layers may be applied by printing such as screen printing or offset printing, particularly waterless offset printing.

It is noted that if there are other layers (e.g., sealing layer or adhesive layer) between the top surface of the partition walls and the first electrode layer (82), the color enhancing layers may be applied onto such a layer, with registration, in areas corresponding to the top surface of the partition walls by any of the methods mentioned above.

In one embodiment of this design, the color enhancing layers (84) themselves may have reflective characteristics. Alternatively, the partition walls may have reflective characteristics. Further alternatively, there may be a reflector between the display panel and the second electrode layer (83). It is also possible that the second electrode layer has a reflective surface or there may be a reflector placed behind the second electrode layer.

For illustration purpose of the figures, it is assumed that the charged pigment particles are of the white color and positively charged, the dye solution is of a grey color and the top surface of the partition walls comprises color enhancing layers of a red color. The first electrode layer (82) is the viewing side.

When the voltage of the first electrode layer (82) is set low and the voltage of the second electrode layer (83) is set high, because of the voltage difference, the positively charged white particles migrate to, and gather at, the first electrode (82). The red color of the color enhancing layers (84) and the white color of the positively charged pigment particles, in this scenario, are seen simultaneously by the viewer from the viewing side. As a result, a white color with a slight tint of red is perceived visually, from cell X.

When the voltage of the first electrode layer (82) is set high and the voltage of the second electrode layer (83) is set low, because of the voltage difference, the positively charged white particles migrate to, and gather at, the second electrode (83). Therefore from the viewing side, the display cells will display the color of the dye solution, i.e., grey. However, as a result of the grey color of the dye solution and the red color enhancing layers (84) seen simultaneously by a viewer from the viewing side, a grayish red color is perceived visually, from cell Y.

This alternative design also provides a two color system as described above by selecting appropriate color combinations of the charged pigment particles, the dye solution and the color enhancing layers.

Figure 9A:
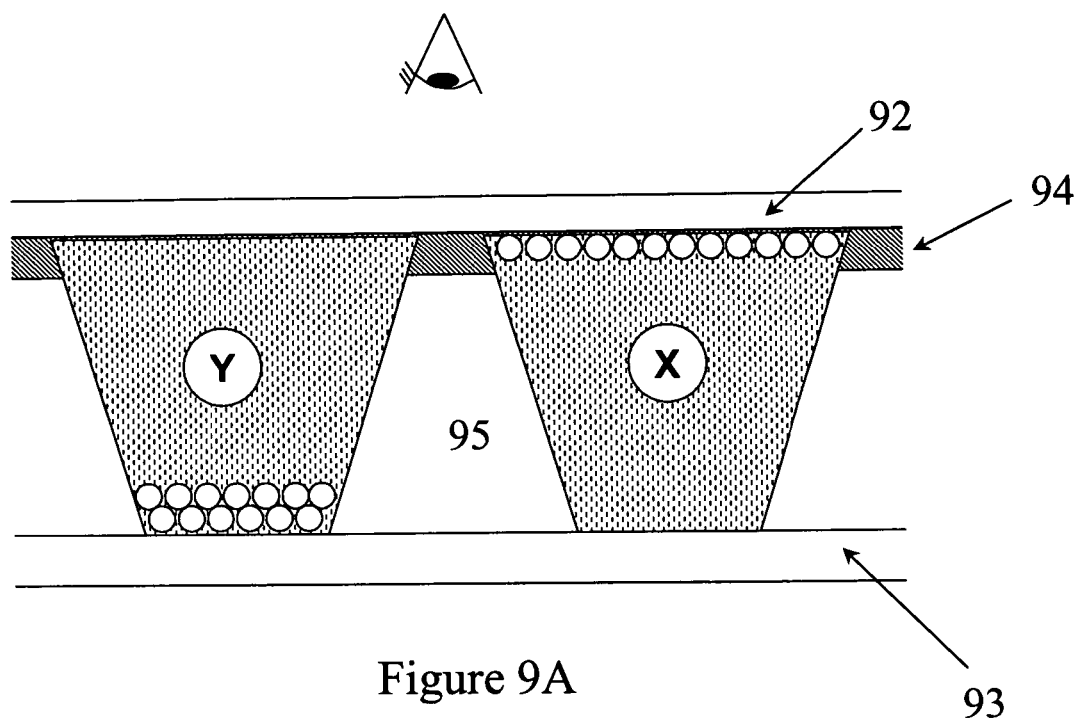
FIGS. 9A and 9B illustrate a further reflective display with the display cell configuration of FIG. 4.
Figure 9B:
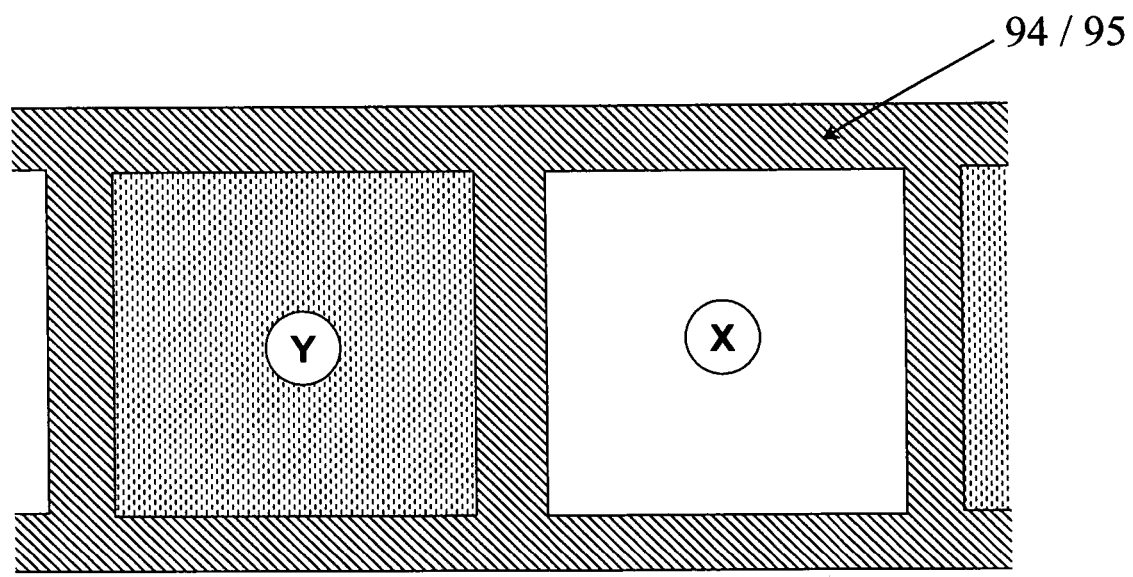

FIGS. 9A and 9B illustrate a reflective display of this alternative design with the new display cell configuration as described in FIG. 4. Again, for illustration purpose, the charged pigment particles are of the white color and positively charged, the dye solution is of a grey color and the color of the color enhancing layers (94) is of a red color. The first electrode layer (92) is the viewing side.

FIG. 9A is a cross-section view of a display panel having the configuration as described in FIG. 4 and FIG. 9B shows a top view.

In FIG. 9A, when the positively charged particles migrate to, and gather at, the first electrode (92), as shown in cell X, visually a white color with a slight tint of red is perceived by the viewer from the viewing side. However when the positively charged particles migrate to, and gather at, the second electrode layer (93) as shown in cell Y, the color shown from the top opening the cell will have a grey color of different shades. However, visually a grayish red color is perceived, from cell Y, from the viewing side because of the red color enhancing layers.

IV. Reflective Direct Drive Display

Figure 10:
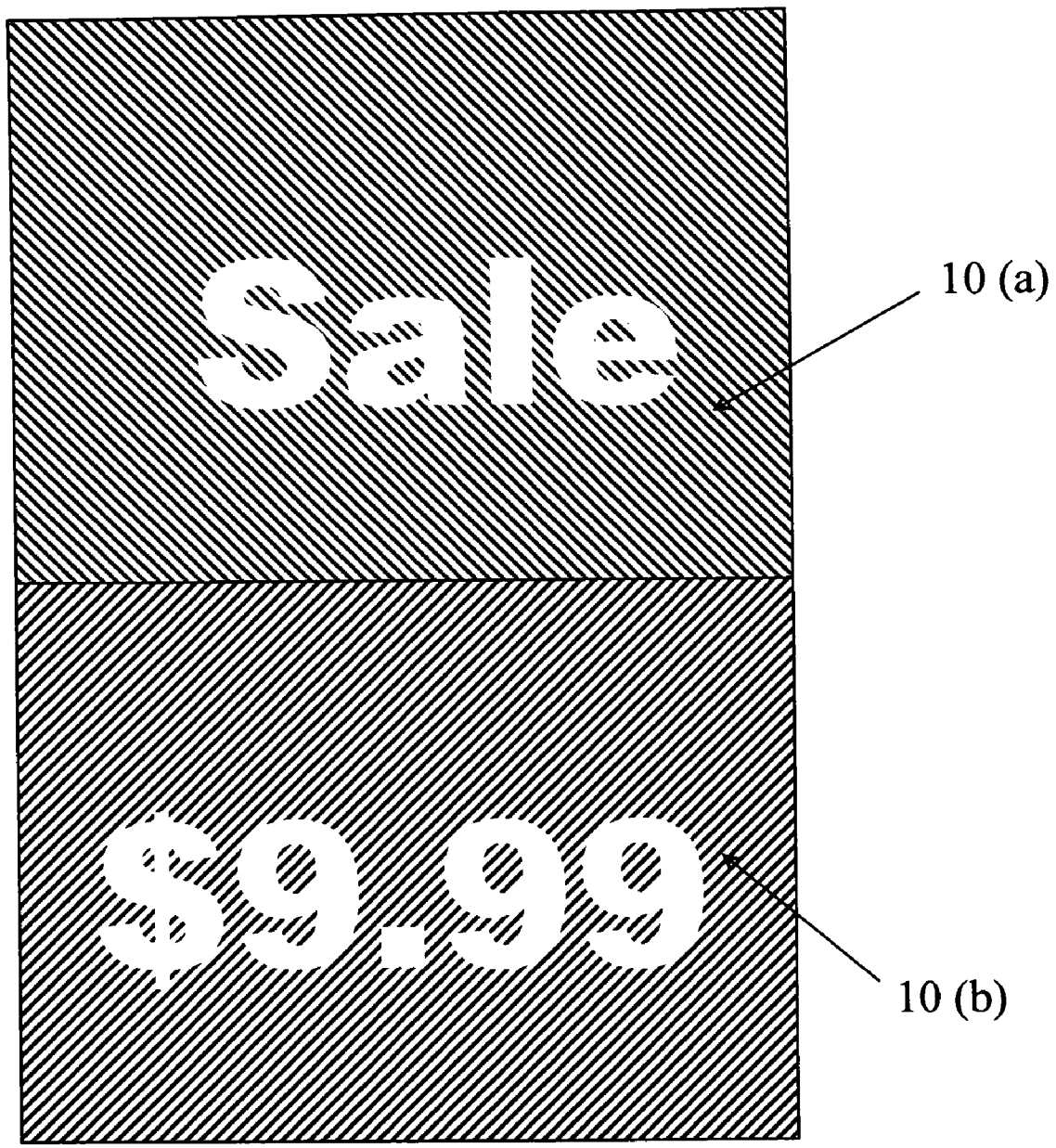
FIG. 10 illustrate a reflective direct drive (segment) display of the present invention.

The reflective display of the present invention is particularly useful for a direct drive (or segment) display. FIG. 10 is an example of a direct drive display of the present invention. Utilizing any one of the three specific embodiments illustrated above, the top area of the display may show a two color system of one color combination whereas the bottom area may show a two color system of a different color combination.

Using the first embodiment of the present invention as an example, in the top area (10a), a red color enhancing layer is used and in the bottom area (10b) a blue color enhancing layer is used. Therefore the top area of the display shows a white/red combination whereas the bottom area shows a white/blue color combination. In this example, white charged particles are dispersed in a grey-color dye solution.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A reflective display comprising:
   a) a first electrode layer on the viewing side;
   b) a second electrode layer on the non-viewing side;
   c) a display panel sandwiched between the first electrode layer and the second electrode layer and the display panel comprises a display fluid separated by partition walls or spacers which are transparent, semi-transparent, translucent or semi-translucent; and
   d) a color enhancing layer between the display panel and the second electrode layer, wherein said color enhancing layer is an adhesive layer.

2. The reflective display of claim 1 wherein said second electrode layer has a reflective surface.

3. The reflective display of claim 1 wherein said color enhancing layer is formed of a polymeric material.

4. The reflective display of claim 1 wherein said display panel comprises an array of display cells having the shape of a trapezoid having the top parallel line longer than the bottom parallel line.

5. The reflective display of claim 1 which is a reflective segment display wherein the first electrode layer is a common electrode layer and the second electrode layer is a backplane comprising segment electrodes.

6. The reflective display of claim 1 wherein said display panel is prepared by the microcup technology.

7. The reflective display of claim 1 wherein said display fluid is an electrophoretic display fluid comprising charged pigment particles dispersed in a dielectric solvent or solvent mixture.

8. The reflective display of claim 7 wherein said charged pigment particles are formed of $TiO_2$.

9. The reflective display of claim 7 wherein said dielectric solvent or solvent mixture is colored.

10. The reflective display of claim 9 wherein said dielectric solvent or solvent mixture is of a dark neutral color.

11. The reflective display of claim 10 wherein said dark neutral color is black, near black, dark grey, grey or dark green.

12. The reflective display of claim 1 wherein said display fluid is a liquid crystal composition.

* * * * *